US010388267B2

(12) United States Patent
Nedwell

(10) Patent No.: US 10,388,267 B2
(45) Date of Patent: Aug. 20, 2019

(54) ACOUSTIC DEVICE FOR FORMING A WALL OF SOUND UNDERWATER

(71) Applicant: Fish Guidance Systems Limited, Southampton (GB)

(72) Inventor: Jeremy Ross Nedwell, Hampshire (GB)

(73) Assignee: FISH GUIDANCE SYSTEMS LIMITED, Hampshire (GB)

(*) Notice: Subject to any disclaimer, the term of this patent is extended or adjusted under 35 U.S.C. 154(b) by 54 days.

(21) Appl. No.: 15/663,438

(22) Filed: Jul. 28, 2017

(65) Prior Publication Data
US 2018/0033423 A1    Feb. 1, 2018

(30) Foreign Application Priority Data
Jul. 29, 2016    (GB) .................................. 1613141.9

(51) Int. Cl.
*G10K 11/26* (2006.01)
*G10K 11/22* (2006.01)
(Continued)

(52) U.S. Cl.
CPC .............. *G10K 11/26* (2013.01); *A01K 79/02* (2013.01); *A01M 29/16* (2013.01); *G10K 11/22* (2013.01);
(Continued)

(58) Field of Classification Search
CPC ........ G10K 11/26; G10K 15/02; G10K 11/32; G10K 11/22; A01K 79/02; A01M 29/16;
(Continued)

(56) References Cited

U.S. PATENT DOCUMENTS

| 3,142,034 A * | 7/1964 | Junger | G10K 13/00 116/137 A |
| 2005/0232083 A1* | 10/2005 | Borsina | A01K 15/02 367/139 |

(Continued)

FOREIGN PATENT DOCUMENTS

| CA | 1 123 089 A | 5/1982 | |
| CA | 2974315 A1 * | 1/2018 | ............. G10K 11/22 |

(Continued)

OTHER PUBLICATIONS

Patents Act 1977: Combined Search and Examination Report under Sections 17 and 18(3) for Great Britain Patent Application No. 1613141.9, dated Dec. 20, 2016, 6 pages.

*Primary Examiner* — Daniel Pihulic
(74) *Attorney, Agent, or Firm* — Westman, Champlin & Koehler, P.A.

(57) ABSTRACT

An acoustic device for forming a wall of sound underwater. Walls of sound are useful in water for guiding fish away from areas. Hitherto, systems have used bubbles of water to facilitate the speed of travel of the sound. Those systems have suffered from the ability to maintain a consistent wall of bubbles and have often been inefficient. The present invention seeks to provide an acoustic device for forming a wall of sound underwater and comprises a transducer connected to an acoustic waveguide. The waveguide comprises one or more projections, whereby sound generated by the transducer travels along the projection or projections to form the wall of sound. The waveguide may typically comprise compressible projections formed from neoprene. These projections are arranged in a fan or frond shape. In addition or alternatively, the projections may be laminar. The projections could be of different lengths.

23 Claims, 4 Drawing Sheets

(51) Int. Cl.
    *H04R 1/44*         (2006.01)
    *H04R 1/34*         (2006.01)
    *H04R 1/40*         (2006.01)
    *H04R 1/28*         (2006.01)
    *A01M 29/16*       (2011.01)
    *G10K 11/32*       (2006.01)
    *G10K 15/02*       (2006.01)
    *A01K 79/02*       (2006.01)

(52) U.S. Cl.
    CPC .............. *G10K 11/32* (2013.01); *G10K 15/02* (2013.01); *H04R 1/2853* (2013.01); *H04R 1/34* (2013.01); *H04R 1/40* (2013.01); *H04R 1/44* (2013.01)

(58) Field of Classification Search
    CPC .......... H04R 1/40; H04R 1/34; H04R 1/2853; H04R 1/44
    See application file for complete search history.

(56) References Cited

U.S. PATENT DOCUMENTS

2013/0216083 A1*   8/2013  McElveen .............. G10K 11/26
                                                                       381/337
2018/0033423 A1*   2/2018  Nedwell ................ G10K 11/22

FOREIGN PATENT DOCUMENTS

| EP | 3276615 A1 | * | 1/2018 | ............ G10K 11/22 |
|---|---|---|---|---|
| GB | 2114295 B | * | 9/1985 | ......... G01S 7/52047 |
| GB | 201613141 | * | 9/2016 | ............ G10K 11/22 |
| GB | 2552780 A | * | 2/2018 | ............ G10K 11/22 |
| WO | 92/19100 A1 | | 11/1992 | |
| WO | 93/00003 A1 | | 1/1993 | |

* cited by examiner

ACOUSTIC DEVICE FOR FORMING A WALL OF SOUND UNDERWATER

CROSS-REFERENCE TO RELATED APPLICATIONS

This application is a non-provisional application and claims priority to Great Britain Patent Application No. 1613141.9, filed on Jul. 29, 2016, the content of which is hereby incorporated by reference.

The present invention relates to an acoustic device for forming a wall of sound underwater.

BACKGROUND

It is well known that the speed of sound in any medium is determined by the density of the medium and its compressibility. Sound tends to travel at high speed in a medium that is either relatively incompressible, or has a low density. It is known that sound travels at a relatively high speed of about 1500 m/s in water, whilst all the water is very dense, it is also highly incompressible.

It is also well known that sound travels at low speed in water containing a small proportion of bubbles. Water containing a small percentage of bubbles is still dense, but due to the compressible gas in the bubbles, it is relatively compressible. Consequently, the speed of sound in bubbly media may drop to 50 m/s or less.

Hitherto there have been arrangements which can use the compliant properties of a sheet of bubbles of a gas in water to funnel sound. Such an arrangement can form "walls" of sound which are suitable, for instance, for guiding fish away from water offtakes where they might be entrained and killed. The sound maybe generated by a pneumatic source, or by an underwater loudspeaker or "projector".

The difference in speeds of sound in water with or without bubbles may be used to cause channelling of sound. In a bubble plume in water, the sound within the plume will travel relatively slowly, and that outside relatively fast, so that the wave front becomes "bent" towards the axis of the plume. In other words, the sound is trapped within the plume. This technology has been shown to be effective in applications where the sound is used to prevent fish kill by guiding fish away from hazardous areas, such as water offtakes.

Existing technology has four main disadvantages. First, it requires the use of a compressor to generate the bubbles. Frequently, where the line along which the fish must be guided is long, a long line of bubbles is required, which may require the use of large compressors. Often, the fish must be deterred from entering an area at all times, so that the compressor must be operated non-stop. This may cost a great deal as a result of the electricity used. In addition, where the water is deep, and a bubble curtain to the sea or river bed is required (that is, is has to exclude fish at all depths) the compressible gas must be pumped in to form the bubble curtain at the bottom of the water channel. Since the ambient pressure at that depth will be greater than atmospheric pressure, in order to retain a given volumetric flow at that depth, a greater volume of compressible gas at atmospheric pressure has to be pumped. For instance, at a depth of only 10 meters, the compressible gas flow requirements are roughly doubled. Clearly, this will further increase the cost of providing the compressed compressible gas.

Second, it is difficult to ensure that the line of bubbles is even. For instance, it is often the case that the wall of bubbles will be formed by means of a long pipe or pipe drilled with small holes at regular intervals, laid along the sea or river bed. Compressed compressible gas is forced into this pipe, and is released via the small holes. The flow of compressible gas through any one of the holes is controlled by the differential pressure between the inside of the pipe and the ambient pressure in the water outside the pipe. The greater this differential pressure, the greater the flow of compressible gas that will occur. If the ambient pressure at one region of the pipe is different to that at another point, the compressible gas will tend to selectively flow through the holes where the ambient pressure is the lowest. Thus, the bubble pipes tend to selectively bubble at the points in the pipe which are the highest in the water. To some extent, this effect may be minimised by making the holes small, and using a high internal pressure within the pipe (that is, of the compressed compressible gas), such that the differential pressure differences due to the ambient pressure differences are small when compared with the overall differential pressure. However, this means that the compressible gas must be at an even greater pressure than the ambient pressure, and the volumetric flow required from the compressor is even higher as a result.

Thirdly, where this approach is used, if the flow of compressible gas is to be reasonably low irrespective of the high internal pressure, the holes must often be very small if the overall flow of compressible gas for the entire bubble curtain is to be sufficiently low. Under these circumstances, it is easy for the holes to block as a result of small particles of debris carried by the compressed compressible gas, or by corrosion, or by biofouling.

In addition, the volume of compressible gas as a function of the depth of the bubble sheet is not under the control of the user. As a consequence of the diminishing ambient pressure they experience, the bubbles released from the pipe will expand as they rise through the water, such that the volume of compressible gas in the water will vary as the bubble sheet ascends towards the water surface. Thus, the acoustical behaviour of the bubbles will change with depth, which makes an optimal design of such a system difficult or impossible to achieve.

This is also made more difficult by the fact that the bubbles have significant buoyancy, and tend to entrain water and carry it to the surface. This may be seen by the typical appearance of an "upwelling" of water with the bubbles at the water surface. The fact that the water is entrained and helps to carry the bubbles to the surface means that the time that the bubbles spend in the water is reduced, that is, a larger volume of bubbles has to be provided in order to ensure a given volume of compressible gas in the water, than would be the case if there were no entrainment. This, again, means that the volume of compressed compressible gas required is further increased.

Finally, whereas the bubbles may initially create a laminar "wall", as they ascend through the water a point is reached where the bubble sheet breaks up into swirls and patches of bubbles. This is thought to be a consequence of the sheet becoming turbulent as a result of the buoyant ascent. A similar phenomenon may be observed in the smoke and flame above a candle. Initially, the flame from a candle rises upwards in a linear and well-ordered manner. However, an inch or two above the candle, the smoke undergoes a transition and breaks up into swirls and eddies of smoke. This effect is thought to be very similar physically to the effect seen in the bubble sheet, where typically having risen a few meters as a linear sheet the bubbles break up into large eddies. Since there may be large spaces in between the eddies, their ability to carry sound is significantly decreased.

As the ascent of the bubbles continues, they may arrive at the surface in periodic "gouts" of compressible gas.

SUMMARY

Thus it is an aim of the present invention to mitigate such disadvantages. Accordingly, the present invention is directed to an acoustic device for forming a wall of sound in water, said device comprising a transducer connected to an acoustic waveguide, the waveguide comprising one or more projections, whereby sound generated by the transducer travels along the projection or projections to form the wall of sound.

BRIEF DESCRIPTION OF THE DRAWINGS

Embodiments of the present invention will be described by way of further example only and with reference to the accompanying drawings, in which.

DETAILED DESCRIPTION OF ILLUSTRATIVE EMBODIMENTS

Figure 1:
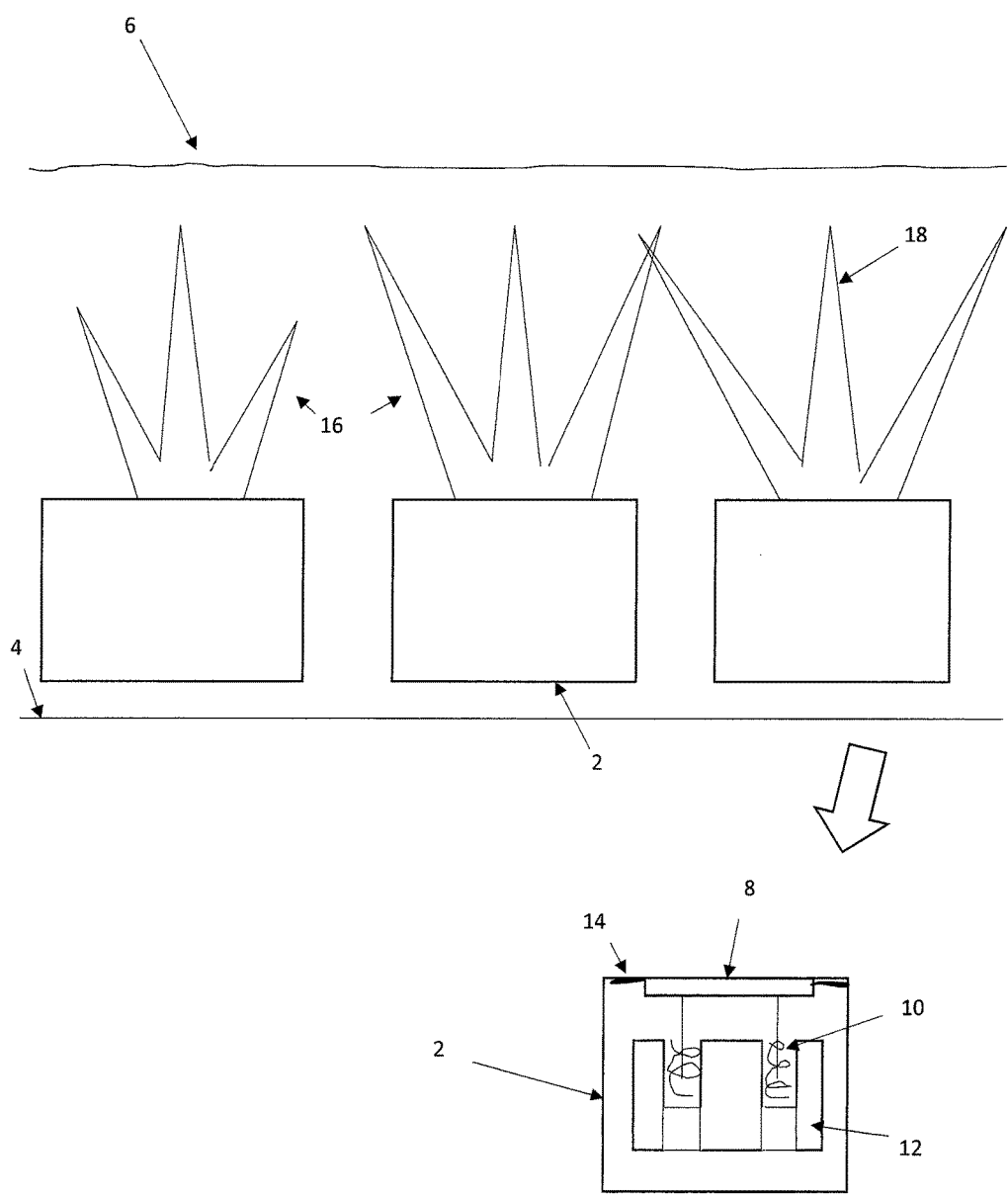
FIG. 1 is a schematic diagram of the present invention.

FIG. 1 illustrates a first embodiment of the present invention. In this instance, the present invention is described in the sense of using the system to generate a sound field. The embodiment comprises two elements, means for generating a sound and fronds of material of a compressible nature to alter the propagation of the sound.

A set of transducers or loudspeakers or projectors 2 are provided at intervals at a convenient position underwater. The transducers 2 are located on the seabed 4 or platform (not shown) but below the water surface 6. The transducers may for instance be mounted at the mid-water depth where the water is shallow.

The transducers 2 are provided with a diaphragm 8, coil 10 and magnet 12 housed in a flexible surround 14 in accordance with known underwater loudspeakers.

A waveguide 16 is connected to each transducer 2. Each waveguide 16 is formed from a set of one or more compressible projections 18. These compressible projections 18 serve to "carry" the sound from the underwater projectors 2. These projections are buoyant and so intrinsically float away from the respective transducer.

Depending on the nature and quantity of the compressible projections 18 which are put in the water, the waveguide 16 can both match the impedance of the surrounding water to the transducer 2. Accordingly, sound is transduced using small volume displacements of the radiated sound field at high acoustic pressure instead of large volume displacements of the projectors at low acoustic pressure. The waveguide 16 also conducts the sound through the area around the projectors through the surrounding water by locally reducing the impedance of the water. Finally, and if required, by gradually reducing the quantity of the compressible projections 18 at the periphery of the waveguide 16, the sound travelling in the waveguide can be efficiently conducted into the surrounding water.

Figure 2:
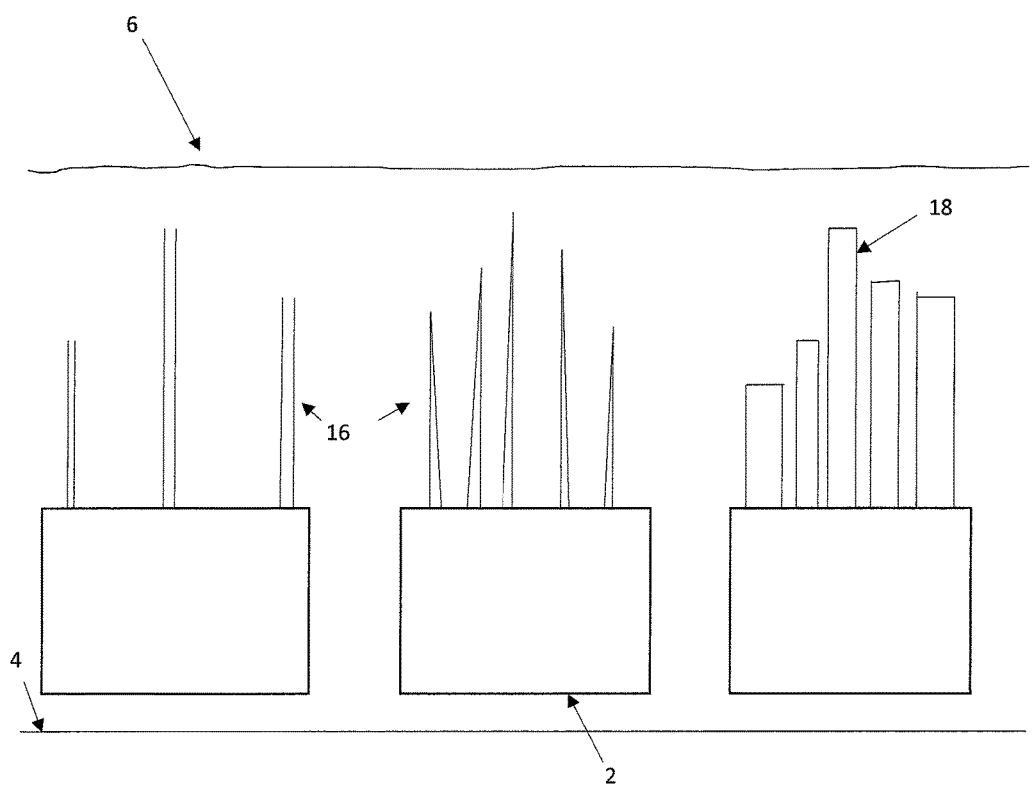
FIG. 2 is a schematic diagram of an alternative embodiment.
Figure 3:
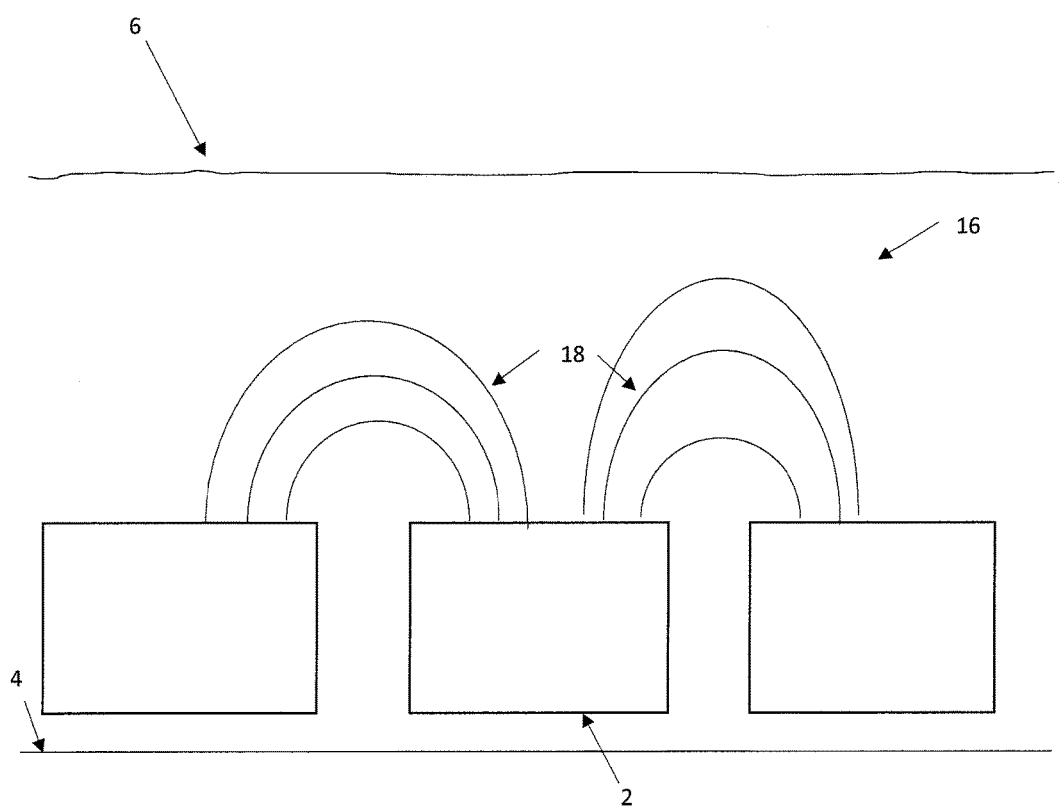
FIG. 3 is a schematic diagram of a further alternative embodiment.
Figure 4:
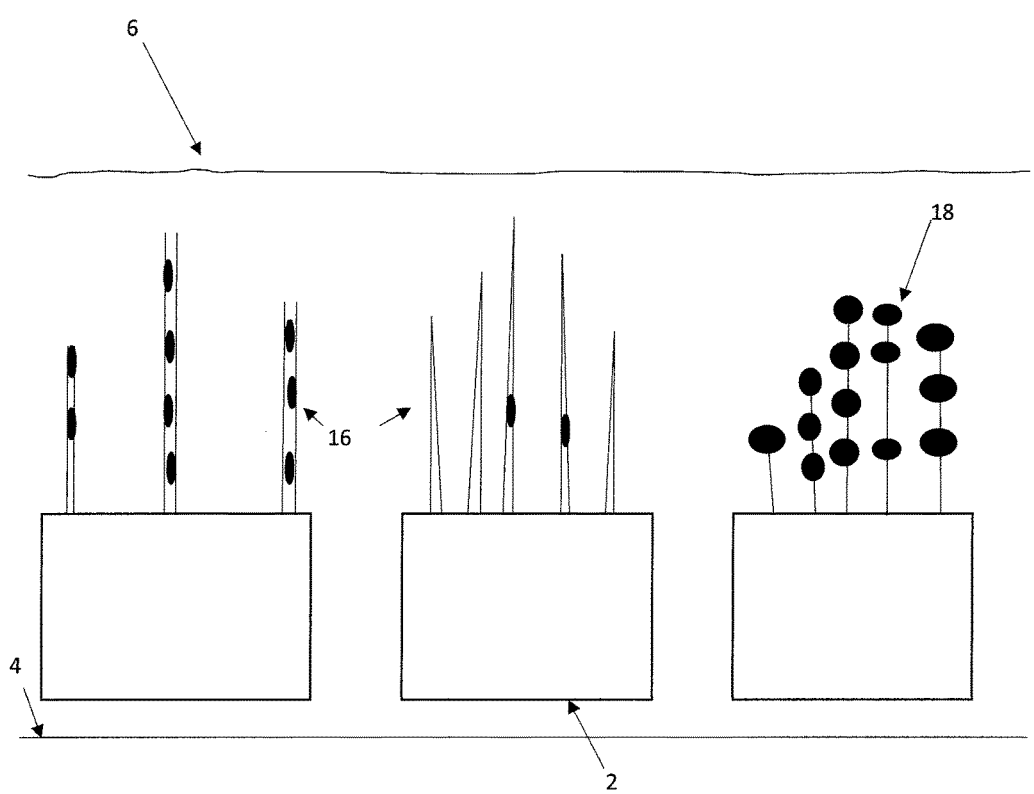
FIG. 4 is a schematic diagram of a further alternative embodiment.

FIGS. 2, 3 and 4 illustrate alternative waveguides 16 with different arrangements of the compressible projections 18.

Typically, the waveguide 16 may be comprised of strings of a compressible material, typically oriented in the direction in which the sound is to travel. The strings need to be relatively compressible when compared with the surrounding water. For instance, the strings may be a compressible gas-containing foam such as foam neoprene. Since a small proportion of compressible gas is sufficient to significantly locally vary the acoustic impedance of the mixture of water, the volume of the strings may not have to be particularly large to form an effective acoustic waveguide. A system might, for instance, comprise strings of perhaps a few mm square, spaced at a distance of a few tens of mm. The strings could be fixed by tying at each end, or could be secured at the bottom and allowed to float under their own buoyancy in the water.

While the strings might be of constant cross-section along their length, it would be possible to ensure that any particular volume of compressible gas that is necessary to provide an efficient waveguide is provided at any depth, by simply allowing for the effects of depth in compressing the material. For instance, if it were desired to achieve a constant proportion of compressible gas with depth, the volume of the compressible gas containing material when cut at the surface would be roughly twice as great for the material that would finish up at 10 meters depth as for that at the surface, and three times as great for that at 20 meters. When the material was deployed in the water, the material at 20 m would be compressed by a factor of about three, and that at 10 m by a factor of two, ensuring a constant volume of the deployed material along its entire length.

It may be beneficial to provide material whereby the volume of material is not constant with depth, or not constant along the wall. For instance, a significant problem with underwater projectors is the fact that they must provide a very high force if they are to radiate sound into the dense medium of water. However, if a much larger volume of material is provided near to the projector, it will greatly reduce the acoustic load on it. This means that a transducer that provides large volume displacements, but at a much lower force, can radiate the same sound power. Such transducers are much easier to manufacture, and have a greater life than traditional underwater transducers. If the material tapers away from the transducer, it can act as an acoustic transformer, allowing the low forces and pressures at the transducer to be converted to high pressures elsewhere in the curtain. This is of benefit in providing a maximum sound from the system.

There are many alternative ways by which the waveguide 16 may be provided. For instance as shown in FIG. 4, the strings may be formed of a compliant material such as a rubber, formed into a balloon with gas material inside. Such balloons could be fixed along a cord or rope, being spaced sufficiently closely that they behave in a similar way to the continuous compressible material of above. Alternatively, the compressible material could be provided by a tube of thin rubber or a similar material containing gas. The tube could be pressurised prior to deployment.

Where boats or shipping may use the water in which the system is located, the waveguide 16 may be terminated at a suitable depth below the surface. In this case, sound will still leak out from the tip of the strings and hence the system may still have effectiveness for fish in the water above the system.

The device therefore has several important advantages. The principal advantage of the system is that since no compressor is required to form bubbles, the system is much more economical to run in applications such as fish guidance systems, where it may have to be run for long periods of time. In addition, it is possible to form an accurate "wall" of sound. This is because the projections 18 are tethered to the transducer and any movement of the projections is more restricted and more in synchronisation with neighbouring projections. Hence the wall of sound is more constant and less chaotic as is the case with bubble curtains which is more susceptible to disturbance. Finally, as any arbitrary amount of compressibility at any point may be readily provided, it is possible to optimise the performance of the system.

The afore going description has been given by way of example only and it will be appreciated by a person skilled in the art that modifications can be made without departing from the scope of the present invention.

The invention claimed is:

1. An acoustic device for forming a wall of sound underwater, said device comprising a transducer connected to an acoustic waveguide, the waveguide comprising one or more projections, whereby sound generated by the transducer travels along the projection or projections to form the wall of sound, wherein the improvement lies in that the or each projection is formed from a gas containing foam material.

2. An acoustic device as claimed in claim 1, wherein there are two or more projections.

3. An acoustic device as claim in claim 1, in which there is a greater volume of the waveguide where connected to the transducer.

4. An acoustic device as claimed in claim 3, in which the projections have different lengths.

5. An acoustic device as claimed in claim 4, in which there are three or more projections and are disposed such the length of the middle projection is shorter than the length of the outer projections.

6. An acoustic device as claimed in claim 2, wherein the projections are arranged in a fan/frond.

7. An acoustic device as claimed in claim 4, in which there are three or more projections and are disposed such the length of the middle projection is longer than the length of the outer projections.

8. An acoustic device as claimed in claim 2, wherein the projections are laminar.

9. An acoustic device as claimed in claim 1, in which each projection is tapered at the end not connected to the acoustic waveguide.

10. An acoustic device as claimed in claim 1, wherein there are two or more transducers and that the transducers are disposed so as to provide a contiguous wall of sound.

11. An acoustic device as claimed in claim 10, in which each end of the or each projection is connected to a transducer.

12. An acoustic device for forming a wall of sound underwater, said device comprising a transducer connected to an acoustic waveguide, the waveguide comprising one or more projections, whereby sound generated by the transducer travels along the projection or projections to form the wall of sound wherein the improvement lies in that the or each projection is formed from a tube of thin rubber containing a gas.

13. An acoustic device as claimed in claim 12, in which said tubes are pressurised prior to deployment.

14. An acoustic device as claimed in claim 12, wherein there are two or more projections.

15. An acoustic device as claim in claim 12, in which there is a greater volume of the waveguide where connected to the transducer.

16. An acoustic device as claimed in claim 15, in which the projections have different lengths.

17. An acoustic device as claimed in claim 16, in which there are three or more projections and are disposed such the length of the middle projection is shorter than the length of the outer projections.

18. An acoustic device as claimed in claim 14, wherein the projections are arranged in a fan/frond.

19. An acoustic device as claimed in claim 16, in which there are three or more projections and are disposed such the length of the middle projection is longer than the length of the outer projections.

20. An acoustic device as claimed in claim 14, wherein the projections are laminar.

21. An acoustic device as claimed in claim 12, in which each projection is tapered at the end not connected to the acoustic waveguide.

22. An acoustic device as claimed in claim 12, wherein there are two or more transducers and that the transducers are disposed so as to provide a contiguous wall of sound.

23. An acoustic device as claimed in claim 22, in which each end of the or each projection is connected to a transducer.

* * * * *